July 18, 1950  A. JOHNSON ET AL  2,515,713
SELF-CLEANING MIXER DEVICE
Filed June 14, 1949
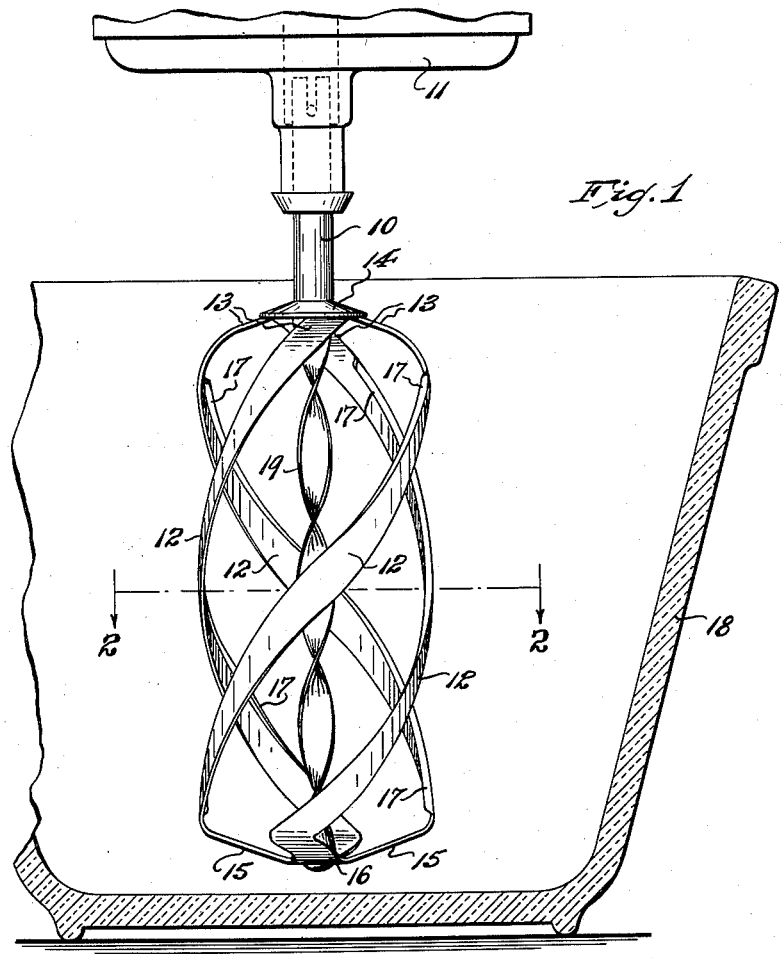
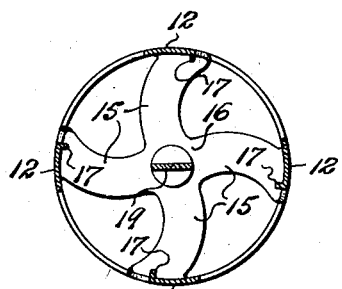
INVENTORS:
Andrew Johnson & Peter Antonioli, Jr.,
BY George D. Richards
Attorney Patented July 18, 1950

2,515,713

UNITED STATES PATENT OFFICE 2,515,713

SELF-CLEANING MIXER DEVICE

Andrew Johnson and Peter Antonioli, Jr., Butte, Mont.

Application June 14, 1949, Serial No. 98,892

4 Claims. (Cl. 259—134)

This invention relates to improvements in rotated mixing devices for use in mechanical mixers and agitators of various kinds, and especially for use in mixing apparatus such as employed in the kitchen for food preparation.

The invention has for its purpose to provide a novel construction of rotatable mixing device which in operation not only effects rapid and thorough mixing of materials desired to be mingled and combined, but which is also substantially self-cleaning when withdrawn from the material operated upon while rotated at high speed; such self-cleaning being accomplished substantially without splashing, spattering or centrifugal discharge of material therefrom. To this end, the novel rotatable mixing device comprises a plurality of spiral blades radially offset from the axis of rotation of the device, with the faces of said blades disposed parallel to such axis, said blades being uniformly spaced from said axis throughout the major extent thereof, so as to move in a cylindrical plane concentric to the axis; upper end portions of the blades converging upon said axis and being secured to the axial driving shaft of the device. The lower ends of the blades terminate in downwardly inclined radial bottom arms of arcuate shape, with the faces of said arms disposed substantially right angularly to the axis of rotation of the device. By reason of this novel construction, the mixing device, when withdrawn from the material operated upon while rotating at high speed, will turn out of the mass of material with a smooth auger-like action, thus carrying but little material with it, and, since radially directed edges and points are substantially eliminated from the external contours of the device, the material will not be thrown off the device centrifugally to any substantial extent, but, on the contrary, will tend to flow downward along the faces of the blades for discharge from the bottom portions thereof. Due to such action, the mixing device will tend to clean itself without substantial splashing, spattering or centrifugal discharge of the material.

It is a further object of this invention to provide a rotatable mixing device, characterized as above set forth, wherein an axially disposed spirally twisted internal blade is included in the structure, which assists in the desired mixing action of the device, and which also tends to be self-cleaning when the rotated device is withdrawn from the material operated upon.

An illustrative embodiment of this invention is shown in accompanying drawings, in which:

Fig. 1 is a side elevational view of one form of the mixing device as operatively entered in a mixing bowl, the latter being shown in section; and Fig. 2 is a horizontal sectional view of the mixing device, taken on line 2—2 in Fig. 1.

Similar characters of reference are employed in the above described views, to indicate corresponding parts.

Referring to the drawings, the reference character 10 indicates the drive shaft of the mixing device. This drive shaft is adapted to be detachably coupled to a power service, such e. g. as an electric motor 11 of a mixing machine, in any suitable or well known manner. Dependent from the drive shaft 10 is the mixing device per se, which comprises a plurality of spiral mixing blades which are radially offset from the axis of the drive shaft, and uniformly spaced around said axis. The number of spiral blades thus provided is subject to variation, but, as shown in the illustrative embodiment of the mixing device, comprise four in number, spaced ninety degrees apart.

Each mixing blade comprises a body 12 formed from a flat strip of metal or other suitable material of substantial width and of suitable thickness. The body 12 is shaped to provide a spiral formation preferably turning through 180 degrees about the axis of the drive shaft, and spaced from said axis at uniform radial distance therefrom throughout the major portion of its length, with the faces of the blade disposed parallel to said axis, whereby said blade rotates in a substantially cylindrical plane concentric to said axis. Each blade body 12 terminates in an upper end portion or arm 13 which is suitably curved to converge upon the drive shaft 10 to which its extremity is suitably affixed, as e. g. by means of the coupling flange 14 with which the drive shaft is provided. Each blade body 12 terminates at its lower end in a downwardly inclined, inwardly extending radial bottom arm 15 of arcuate shape, with the faces thereof disposed substantially transverse or right angularly to the axis of rotation of the mixing device.

The inner ends of the bottom arms 15 of the blades are joined to provide an axially disposed central part or hub section 16, which is preferably integral therewith.

In the form of the mixing device as shown, wherein the blade bodies 12 spiral in clockwise direction from their upper ends to their lower ends, the mixing device, in use, is rotated in counterclockwise direction. In a preferred form of the mixing device, as adapted for the aforesaid mode of operation, the trailing edges of the blade bodies 12 are provided along the margins thereof with inwardly projecting angular lips or narrow flanges 17, which are substantially radial to the axis of rotation of the mixing device. These lips or flanges 17 increase the mixing effect of the blade bodies, when the mixing device is submerged and rapidly rotated in a mass of materials desired to be mingled and combined by the operation of the mixing device. Not only do these lips or flanges 17 improve the efficiency of the mixing effect of the blade bodies, but also serve to stiffen and reinforce the same against deformation and displacement from their symmetrically disposed relation to the axis of rotation which is above described. Furthermore, lips or flanges 17 combine with the respective blade bodies to form longitudinal channels for forced downward flow of material.

The device, as thus far described, is suitable for use as a rotatable mixing device, and, when so used, the blade bodies 12 operate to draw the materials operated upon in at the top of the device for down flow and discharge at the bottom thereof, so that the materials are circulated with efficient intermingling effect within the interior of the container thereof, such e. g. as the mixing bowl 18 shown in Fig. 1. At the same time the blade bodies 12 exercise a cutting or slicing action upon the intermingling materials, whereby to assure more intimate mingling of the ingredients and more thorough and uniform blending thereof during the mixing action.

If desired, in addition to the assembly of external blade bodies above described, the mixing device may be further provided with a mixing or agitating element arranged to extend axially through the interior of the external blade assembly. This internal mixing or agitating element, in a preferred form thereof, comprises a spirally twisted axial blade 19 formed from a flat strip of metal or other suitable material. The internal blade 19 thus provided is affixed by its respective ends to the drive shaft 10 and to the central part or hub section 16 of the external blade assembly, so as to be rotated with the latter. The internal blade 19 may be formed with one or more complete spiral turns, which may be directed either clockwise or counterclockwise, as preferred in any given case. In use, this internal spiral blade 19 produces additional agitating and mixing effect upon the mass of materials in which the mixing device is submerged and rotated.

Due to the novel form and construction of the mixing device as above described, both with and without the internal blade 19, not only is the same adapted to produce highly efficient and rapid mixing agitation of materials in which it is submerged and rotated, but, in addition to such primary function, further possesses the advantage of being substantially self-cleaning when, while rotation thereof is continued at high speed, it is withdrawn from the intermingled and combined materials it has operated upon. This self-cleaning effect is attained by the form and disposition of the blade bodies 12, and when included of the internal blade 19, whereby the same, when the rotated mixing device is withdrawn from the mixed material, turn out of said material with an auger-like action, and for the further reason that the contours of the assembly of blades making up the mixing device is such that there are no radially and outwardly directed edges, sharp angles or other projections which, if present, would provide throw-off points from which material could be centrifugally projected. Furthermore, the flat faces of the spirally down-sweeping blades, being disposed concentric to the axis of rotation of the device, are adapted to provide surfaces by which the material is supported in resistance to centrifugal discharge, while at the same time said spirally down-sweeping blades lead the material for down flow under gravity along the surfaces thereof, whereafter to drop away from the device without splash, spatter or substantial centrifugal discharge. Such down flow and ultimate separation of the material from the device renders the latter substantially self-cleaning.

While a single rotated mixing device is shown and above described by way of illustration, it will be understood that more than one such device can be incorporated in a mixing machine if so desired; as, e. g. two such devices arranged side by side and adapted to be rotated in the same or in opposite directions, and, if in opposite directions, the direction of spiral curvature of the blades of one device may, if desired, be opposite to that of those of the other device.

Having now described our invention, we claim:

1. A rotatable mixer device for mixing machines comprising a vertical drive shaft, an assembly of mixing blades connected with said drive shaft for rotation therewith and including a plurality of spiral blade bodies formed from flat strips of relatively thin material, said blade bodies having the major portions of their extent radially offset from the drive shaft and uniformly spaced therefrom, the offset portion of each blade body being transversely curved between the side edges thereof concentric to the drive shaft axis to lie in the periphery of an imaginary cylinder whereby there are no radially directed outer edges to afford throw-off points of adherent material under the influence of centrifugal force, the upper end portions of the blade bodies being inwardly inclined to converge upon the drive shaft in affixed relation thereto, the lower end of said blade bodies terminating in inwardly extending bottom arms joined together in alignment with the drive shaft axis, the concentrically disposed offset major portions of the blade bodies being disposed to spiral downwardly in clockwise direction and adapted to be rotated in counterclockwise direction in operative use, and said major portions of the blade bodies have longitudinal flanges projecting radially inward from the trailing edges thereof, whereby material being mixed will be channeled and propelled axially downward.

2. A rotatable mixer device for mixing machines as defined in claim 1, wherein each blade body is so constructed and arranged that it turns through approximately one hundred and eighty degrees around the axis of the drive shaft.

3. A rotatable mixer device for mixing machines comprising a vertical drive shaft, an assembly of mixing blades connected with said drive shaft for rotation therewith and including a plurality of spiral blade bodies formed from flat strips of relatively thin material, said blade bodies having the major portions of their extent radially offset from the drive shaft and uniformly spaced therefrom, the offset portion of each blade body being transversely curved between the side edges thereof concentric to the drive shaft axis to lie in the periphery of an imaginary cylinder whereby there are no radially directed outer edges to afford throw-off points of adherent material under the influence of centrifugal force, the upper end portions of the blade bodies being inwardly inclined to converge upon the drive shaft in affixed relation thereto, the lower end of said blade bodies terminating in inwardly extending bottom arms joined together in alignment with the drive shaft axis, the blade assembly including a spirally twisted internal blade disposed in prolongation of the drive shaft in affixed relation thereto, said internal blade being twisted clockwise similarly to the outer blade bodies whereby to assist in self-cleaning action of the mixer device as a whole.

4. In a rotatable mixer device for mixing machines comprising a vertical drive shaft, at least one spirally shaped mixing blade body connected with said drive shaft for rotation therewith, said blade being formed from a strip of relatively thin material, said blade body having the major portion of its extent radially offset from the drive shaft in uniformly spaced relation thereto, the offset portion of the blade body being transversely curved between the side edges thereof concentric to the drive shaft axis to lie in the periphery of an imaginary cylinder whereby there are no radially directed outer edges to afford throw-off points of adherent material under the influence of centrifugal force, said offset portion of the blade having a longitudinal flange projecting radially inward from the trailing edge thereof, whereby the material being mixed will be channeled and propelled axially downward, the upper end portion of the blade body being inwardly inclined to converge upon the drive shaft in affixed relation thereto, and the lower end of said blade body terminating in an inwardly extending bottom arm in affixed relation to the drive shaft.

ANDREW JOHNSON.
PETER ANTONIOLI, Jr.

REFERENCES CITED

The following references are of record in the file of this patent:

UNITED STATES PATENTS

| Number | Name | Date |
|---|---|---|
| 582,095 | Rogers | May 4, 1897 |
| 678,456 | Browne | July 16, 1901 |
| 896,848 | Mills | Aug. 25, 1908 |
| 1,494,102 | Crammer | Nov. 13, 1924 |
| 1,783,437 | Laib | Dec. 2, 1930 |

FOREIGN PATENTS

| Number | Country | Date |
|---|---|---|
| 403,450 | France | Nov. 5, 1909 |
| 411,763 | Great Britain | June 14, 1934 |